(12) United States Patent
Jin et al.

(10) Patent No.: US 11,289,776 B2
(45) Date of Patent: Mar. 29, 2022

(54) BATTERY MODULE HAVING BUS BAR ASSEMBLY

(71) Applicant: LG Chem, Ltd., Seoul (KR)

(72) Inventors: Hee-Jun Jin, Daejeon (KR); Sung-Won Seo, Daejeon (KR); Yoon-Koo Lee, Daejeon (KR); Eun-Ah Ju, Daejeon (KR); Jeong-O Mun, Daejeon (KR)

(73) Assignee: LG Energy Solution, Ltd.

( * ) Notice: Subject to any disclaimer, the term of this patent is extended or adjusted under 35 U.S.C. 154(b) by 183 days.

(21) Appl. No.: 16/620,385

(22) PCT Filed: Oct. 11, 2018

(86) PCT No.: PCT/KR2018/011967
§ 371 (c)(1),
(2) Date: Dec. 6, 2019

(87) PCT Pub. No.: WO2019/107735
PCT Pub. Date: Jun. 6, 2019

(65) Prior Publication Data
US 2020/0411832 A1    Dec. 31, 2020

(30) Foreign Application Priority Data
Nov. 30, 2017   (KR) .......................... 10-2017-0162867

(51) Int. Cl.
*H01M 50/502* (2021.01)
*H01M 50/531* (2021.01)
*H01M 50/20* (2021.01)

(52) U.S. Cl.
CPC ......... *H01M 50/502* (2021.01); *H01M 50/20* (2021.01); *H01M 50/531* (2021.01); *H01M 2220/20* (2013.01)

(58) Field of Classification Search
CPC .. H01M 50/502; H01M 50/531; H01M 50/20; H01M 2220/20; H01M 50/50; Y02E 60/10
See application file for complete search history.

(56) References Cited

U.S. PATENT DOCUMENTS 9,583,748 B2 * 2/2017 Choi .................... H01M 50/502
2008/0090137 A1 * 4/2008 Buck ..................... H01M 50/20
429/120

(Continued)

FOREIGN PATENT DOCUMENTS

CN       101217190 A    7/2008
CN       101496217 A    7/2009

(Continued)

OTHER PUBLICATIONS

Machine English translation of Toshiba JP 2014-022195 (Year: 2014).*

(Continued)

*Primary Examiner* — Michael L Dignan
(74) *Attorney, Agent, or Firm* — Lerner, David, Littenberg, Krumholz & Mentlik, LLP

(57) ABSTRACT

A battery module allows improved manufacturing due to easy electric connection between a bus bar assembly and secondary batteries. The battery module includes a cell stack formed by stacking a plurality of secondary batteries having electrode leads on each other in a stacking direction; and a bus bar assembly including a connection bus bar contacting two or more of the electrode leads of the plurality of secondary batteries and having an insert groove formed so that at least one of the electrode leads is inserted therein, and a coupling bus bar coupled to the connection bus bar and having a rear surface formed to press the at least one of the electrode leads inserted in the insert groove.

12 Claims, 13 Drawing Sheets

(56) References Cited

U.S. PATENT DOCUMENTS

| | | | | |
|---|---|---|---|---|
| 2008/0124617 A1* | 5/2008 | Bjork | | H01M 50/502 |
| | | | | 429/90 |
| 2009/0317717 A1 | 12/2009 | Ryu et al. | | |
| 2011/0200866 A1* | 8/2011 | Yun | | H01M 10/0585 |
| | | | | 429/158 |
| 2012/0301747 A1* | 11/2012 | Han | | H01M 10/658 |
| | | | | 429/7 |
| 2012/0328908 A1* | 12/2012 | Han | | H01M 10/425 |
| | | | | 429/7 |
| 2013/0045401 A1* | 2/2013 | Yoon | | H01M 50/543 |
| | | | | 429/90 |
| 2016/0126523 A1 | 5/2016 | Arena et al. | | |
| 2016/0133898 A1 | 5/2016 | Choi et al. | | |
| 2016/0233476 A1* | 8/2016 | Okamoto | | H01M 10/0585 |
| 2016/0248068 A1* | 8/2016 | Ha | | H01M 50/502 |
| 2017/0125774 A1 | 5/2017 | Choi et al. | | |
| 2018/0194235 A1 | 7/2018 | Kim et al. | | |

FOREIGN PATENT DOCUMENTS

| | | | | | |
|---|---|---|---|---|---|
| CN | 101803068 A | 8/2010 | | | |
| CN | 102842695 A | 12/2012 | | | |
| CN | 104979503 A | 10/2015 | | | |
| CN | 105531850 A | 4/2016 | | | |
| CN | 106133948 A | 11/2016 | | | |
| EP | 3046164 A1 | 7/2016 | | | |
| JP | 2009187972 A | 8/2009 | | | |
| JP | 2011517008 A | 5/2011 | | | |
| JP | 2011198660 A | 10/2011 | | | |
| JP | 2011249243 A | 12/2011 | | | |
| JP | 2013084368 A | 5/2013 | | | |
| JP | 2013229266 A | 11/2013 | | | |
| JP | 2014022195 | * | 2/2014 | | H01M 2/20 |
| JP | 2014022195 A | 2/2014 | | | |
| JP | 2015056342 A | 3/2015 | | | |
| JP | 6043428 B2 | 12/2016 | | | |
| KR | 20100013759 A | 2/2010 | | | |
| KR | 20120132338 A | 12/2012 | | | |
| KR | 20120136542 A | 12/2012 | | | |
| KR | 20160115532 A | 10/2016 | | | |
| KR | 20170103232 A | 9/2017 | | | |

OTHER PUBLICATIONS

International Search Report from PCT/KR2018/0011967, dated Jan. 24, 2019, 3 pages.
Extended European Search Report including Written Opinion for Application No. EP18884722.2 dated Sep. 22, 2020, pp. 1-10.
Chinese Search Report for Application No. 201880036534.6 dated Oct. 27, 2021, 3 pages.

* cited by examiner

BATTERY MODULE HAVING BUS BAR ASSEMBLY

CROSS-REFERENCE TO RELATED APPLICATIONS

The present application is a national phase entry under 35 U.S.C. § 371 of International Application No. PCT/KR2018/011967, filed Oct. 11, 2018, which claims priority to Korean Patent Application No. 10-2017-0162867 filed on Nov. 30, 2017 in the Republic of Korea, the disclosures of which are incorporated herein by reference.

TECHNICAL FIELD

The present disclosure relates to a battery module including a bus bar assembly, and more particularly, to a battery module allowing improved manufacturing due to easy electric connection between the bus bar assembly and secondary batteries.

BACKGROUND ART

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. In addition, the lithium secondary battery includes an electrode assembly in which a positive electrode plate coated with the positive electrode active material and a negative electrode plate coated with the negative electrode active material are disposed with a separator being interposed therebetween, and an exterior, namely a pouch exterior, sealably containing the electrode assembly together with an electrolyte.

Generally, the lithium secondary battery may be classified into a can-type secondary battery in which the electrode assembly is included in a metal can and a pouch-type secondary battery in which the electrode assembly is included in a pouch made of aluminum laminate sheets, depending on the shape of the exterior.

In recent years, secondary batteries have been widely used not only in small-sized devices such as portable electronic devices but also in medium-sized or large-sized devices such as vehicles and power storage devices. When the secondary batteries are used in the middle-sized or large-sized devices, a large number of secondary batteries are electrically connected to increase capacity and power. In particular, pouch-type secondary batteries are widely used for the middle-sized or large-sized devices since they may be easily stacked.

In order to electrically connect the secondary batteries inside a battery module, electrode leads are connected to each other, and the connection portions may be welded to maintain the connected state. Further, the battery module may have parallel and/or series electrical connections between the secondary batteries. For this, one end of the electrode lead may be fixed in contact to the bus bar by welding or the like for electrical connection between to each secondary battery.

At this time, the electrical connection between the secondary batteries is frequently configured by bonding the electrode leads to the bus bar. That is, in order to electrically connect a plurality of secondary batteries in parallel, electrode leads of the same polarity are bonded to each other. Also, in order to electrically connect a plurality of secondary batteries in series, electrode leads of different polarities are bonded to each other.

Meanwhile, since the electrode lead is made of a weak material, a worker may easily damage the electrode lead while detaching a coupled electrode lead or bonding the detached electrode lead again when the bus bar and the electrode lead are bonded poorly or erroneously. Thus, it is impossible to perform the rework.

In addition, when a bending process is performed to bend the electrode lead so that the electrode lead is placed on the bus bar, the electrode lead and the bus bar are not easily adhered closely to each other since the bent electrode causes a spring-back phenomenon. Accordingly, since laser welding should be performed in a state where a plurality of electrode leads are closely adhered to each other, the weldability may be easily deteriorated.

Thus, in order to solve the problems of the conventional art as described above, there is a demand for a technique capable of maintaining the contact between the electrode lead and the bus bar and allowing a rework when the bus bar and the electrode lead are bonded poorly or erroneously.

DISCLOSURE

Technical Problem

The present disclosure is designed to solve the problems of the related art, and therefore the present disclosure is directed to providing a battery module, which may allow improved manufacturing due to easy electric connection between a bus bar assembly and secondary batteries.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising:

a cell stack formed by stacking a plurality of secondary batteries having electrode leads on each other in a stacking direction; and a bus bar assembly configured to electrically connect the plurality of secondary batteries to each other and including a connection bus bar contacting two or more of the electrode leads of the plurality of secondary batteries and having an insert groove formed so that at least one of the electrode leads is inserted therein, and a coupling bus bar coupled to the connection bus bar and having a rear surface formed to press the ate least one of the electrode leads inserted in the insert groove.

Also, the connection bus bar and the coupling bus bar may each have a bar shape extending in a vertical direction perpendicular to the stacking direction, and the insert groove may be formed at a front surface of the connection bus bar.

Moreover, the insert groove may have a structure recessed from a front end to a rear end of the connection bus bar, and a recessed depth of the insert groove may be equal to or smaller than an entire thickness of the at least one of the electrode leads inserted into the insert groove.

In addition, a width of the insert groove in the vertical direction may be equal to or greater than a length of the at least one of the electrode leads inserted into the insert groove in the vertical direction.

Further, the bus bar assembly may further include a bus bar frame having a front surface on which the connection bus bar is disposed, the bus bar frame being located between a front portion of the cell stack and a rear portion of the connection bus bar.

Also, the bus bar assembly may further include a fastening member configured to couple the connection bus bar and the coupling bus bar to each other.

Moreover, the fastening member may further include a fastening bolt inserted through the connection bus bar and the coupling bus bar, and a cylindrical rod of the fastening bolt is inserted and fixed in the bus bar frame.

In addition, the insert groove may be formed to extend from one side end to an opposite side end of a front surface of the connection bus bar. Also, a perforation hole may be formed in the at least one of the electrode leads inserted in the insert groove and the fastening bolt is inserted therein. Further, a bent end portion of one of the electrode leads inserted from a left side to a right side of the connection bus bar and a bent end portion of one of the electrode leads inserted from a right side to a left side of the connection bus bar may be stacked on each other in the insert groove.

Moreover, the insert groove may include a plurality of insertion grooves.

Also, one of the plurality of insert grooves may be formed to extend from a left end to a center of the front surface of the connection bus bar, and another of the plurality of insert grooves may be formed to extend from a right end to the center of the front surface of the connection bus bar.

Moreover, an end portion of at least one of the electrode leads inserted from a left side to a right side of the front surface of the connection bus bar may be inserted into the insert groove formed to extend from the left end to the center of the front surface of the connection bus bar.

Further, an end portion of at least one of the electrode leads inserted from the right side to the left side of the front surface of the connection bus bar may be inserted into the insert groove formed to extend from the right end to the center of the front surface of the connection bus bar.

In addition, the electrode leads may include a positive electrode lead and a negative electrode lead. Also, a depth of the insert groove into which the positive electrode lead is inserted and a depth of the insert groove into which the negative electrode lead is inserted may be different.

Moreover, at least one compression protrusion may be formed at the coupling bus bar so as to be inserted into one of the plurality of insert grooves.

Further, the at least one compression protrusion may include two or more compression protrusions, and ridged surfaces of the two or more compression protrusions protruding to be inserted into respective ones of the plurality of insert grooves may have different protruding lengths.

In addition, in another aspect of the present disclosure, there is also provided a battery pack, which includes at least one battery module as above.

Further, in another aspect of the present disclosure, there is also provided a vehicle, which includes the battery pack.

Advantageous Effects

According to an embodiment of the present disclosure, since the electrode lead is inserted into the insert groove formed at the connection bus bar, the battery module may effectively compress the electrode lead by using the coupling bus bar and allow reliable electrical connection without a joining process such as laser welding between the connection bus bar and the electrode lead.

Also, according to an embodiment of the present disclosure, since the connection bus bar and the coupling bus bar may be securely fixed to the bus bar frame using a fastening member, the battery module may have enhanced product durability, and further, the fastening member may compress the coupling bus bar to securely fix the electrode lead to the insert groove.

Moreover, according to this embodiment of the present disclosure, since the gap between the connection bus bar and the coupling bus bar may be controlled by adjusting the distance between the head and the nut of the fastening bolt, the coupling bus bar may press the electrode lead inserted into the insert groove with an appropriate compression force to achieve a reliable electrical connection between the electrode lead and the connection bus bar.

In addition, according to an embodiment of the present disclosure, if the battery module of the present disclosure is used, even during a work for separating the bus bar assembly from the cell stack due to erroneously bonding or erroneously assembling, the electrode lead in contact with the bus bar may be easily detached, and further, it is easy to reconnect the separated connection bus bar to the electrode lead. Thus, even though it is impossible to reassemble the bus bar assembly due to the damage of the electrode lead in the conventional art, the present disclosure has an advantage that the reassembling is possible without a large damage of the electrode lead.

Further, according to an embodiment of the present disclosure, since the compression protrusion may effectively compress the outer surface of the electrode lead inserted into the insert groove of the connection bus bar, the gap between the coupling bus bar and the connection bus bar may be minimized, thereby enhancing the reliability of electrical connection between the electrode lead and the connection bus bar.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
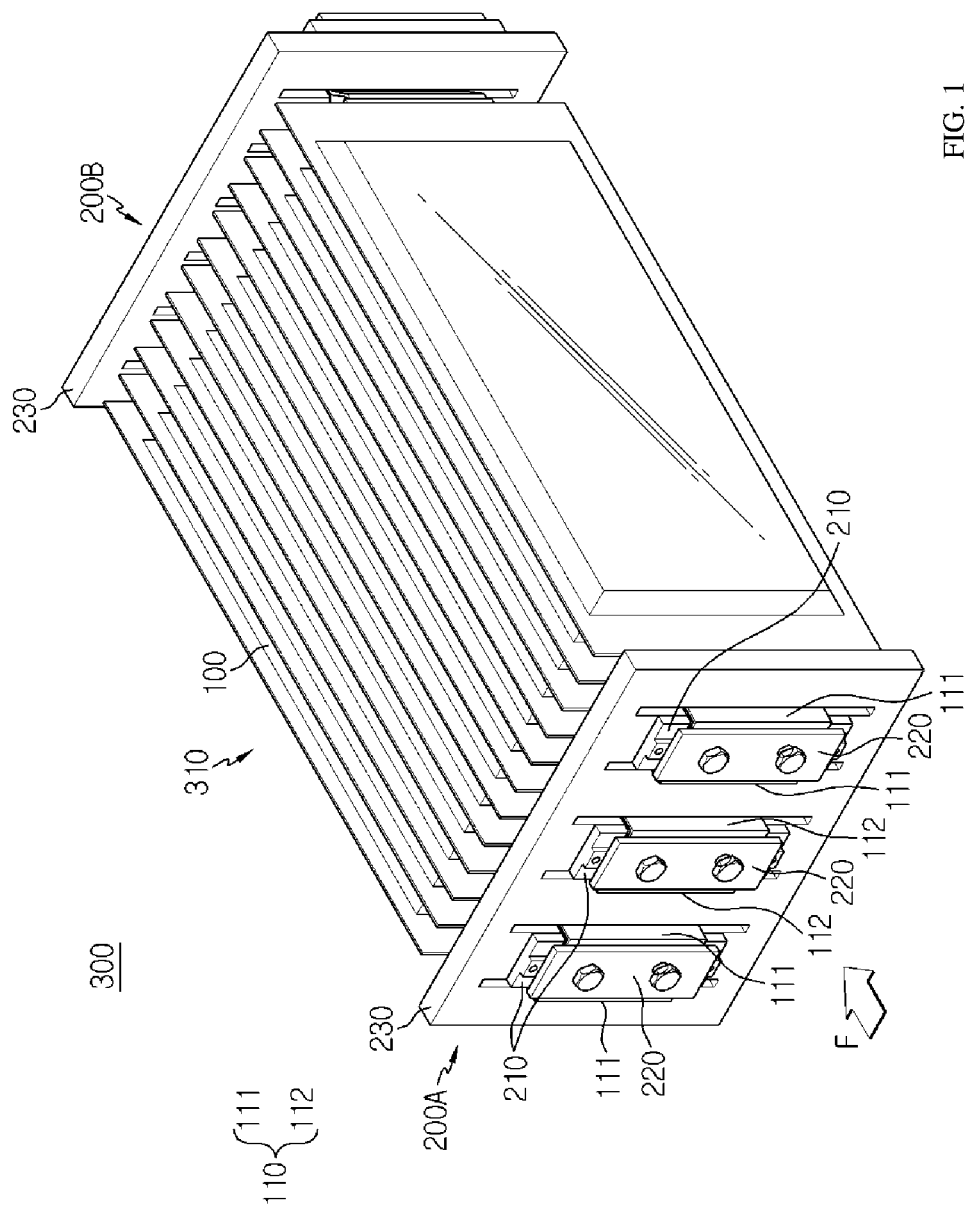
FIG. 1 is a perspective view schematically showing a battery module according to an embodiment of the present disclosure.
Figure 2:
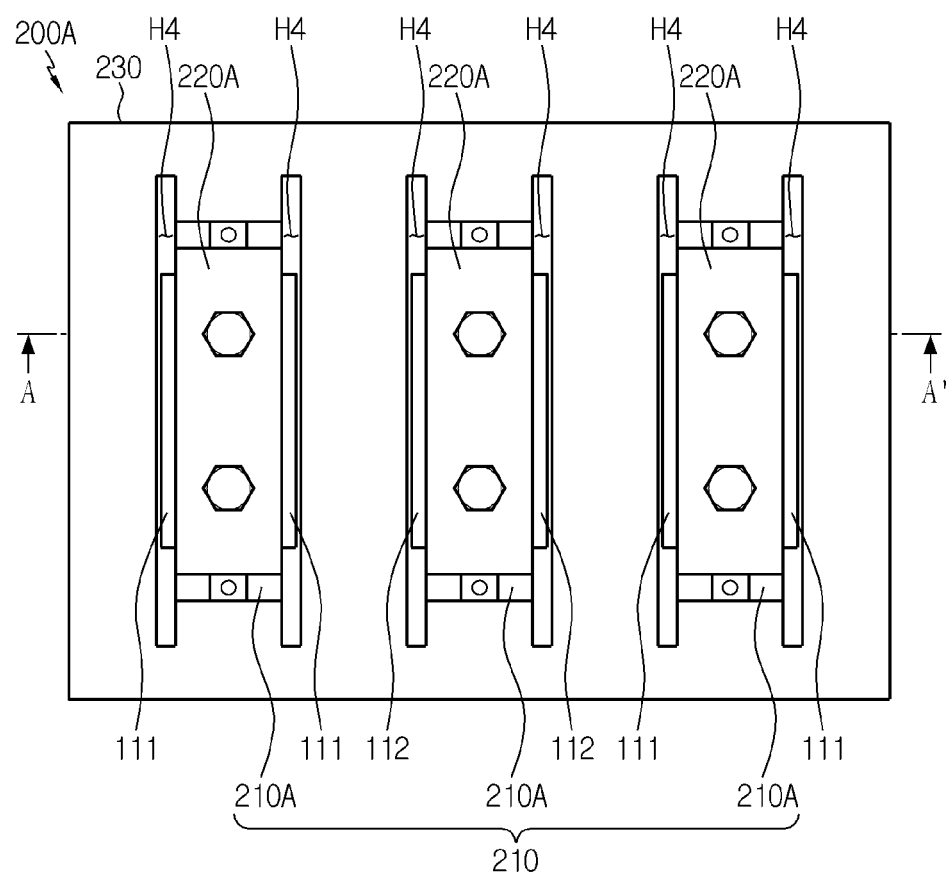
FIG. 2 is a front view schematically showing the battery module according to an embodiment of the present disclosure.
Figure 3:
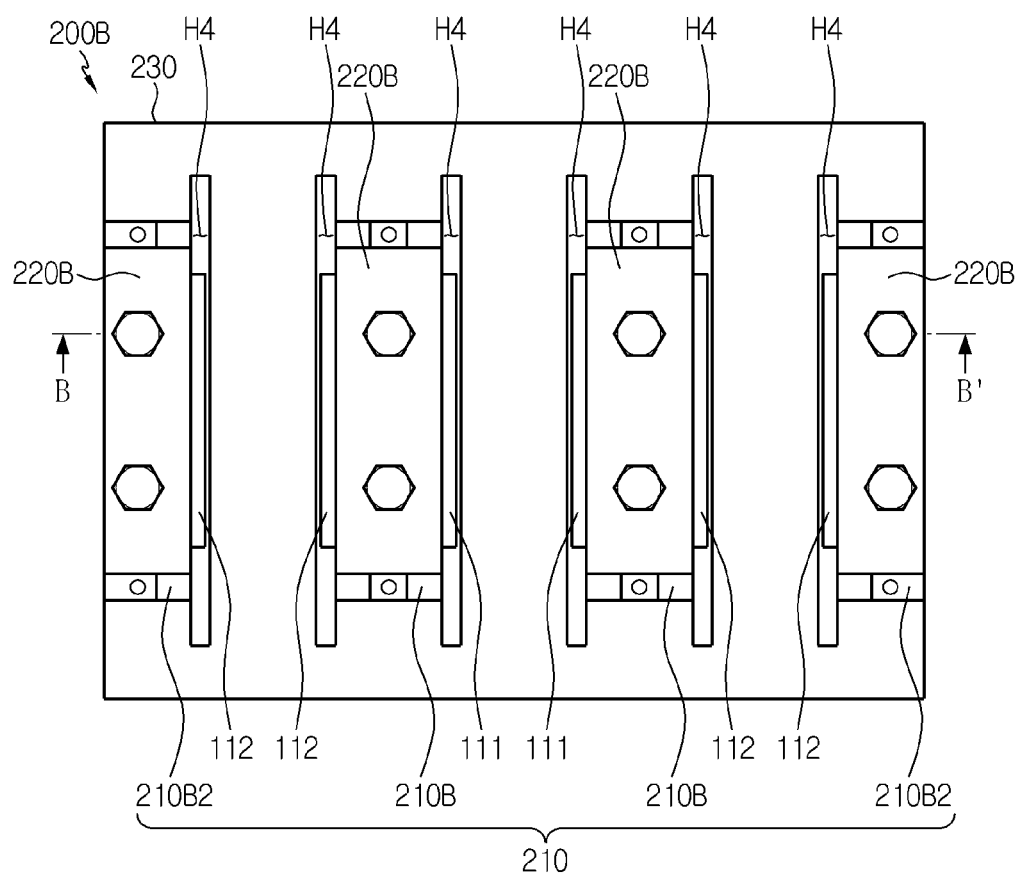
FIG. 3 is a rear view schematically showing the battery module according to an embodiment of the present disclosure.
Figure 4:
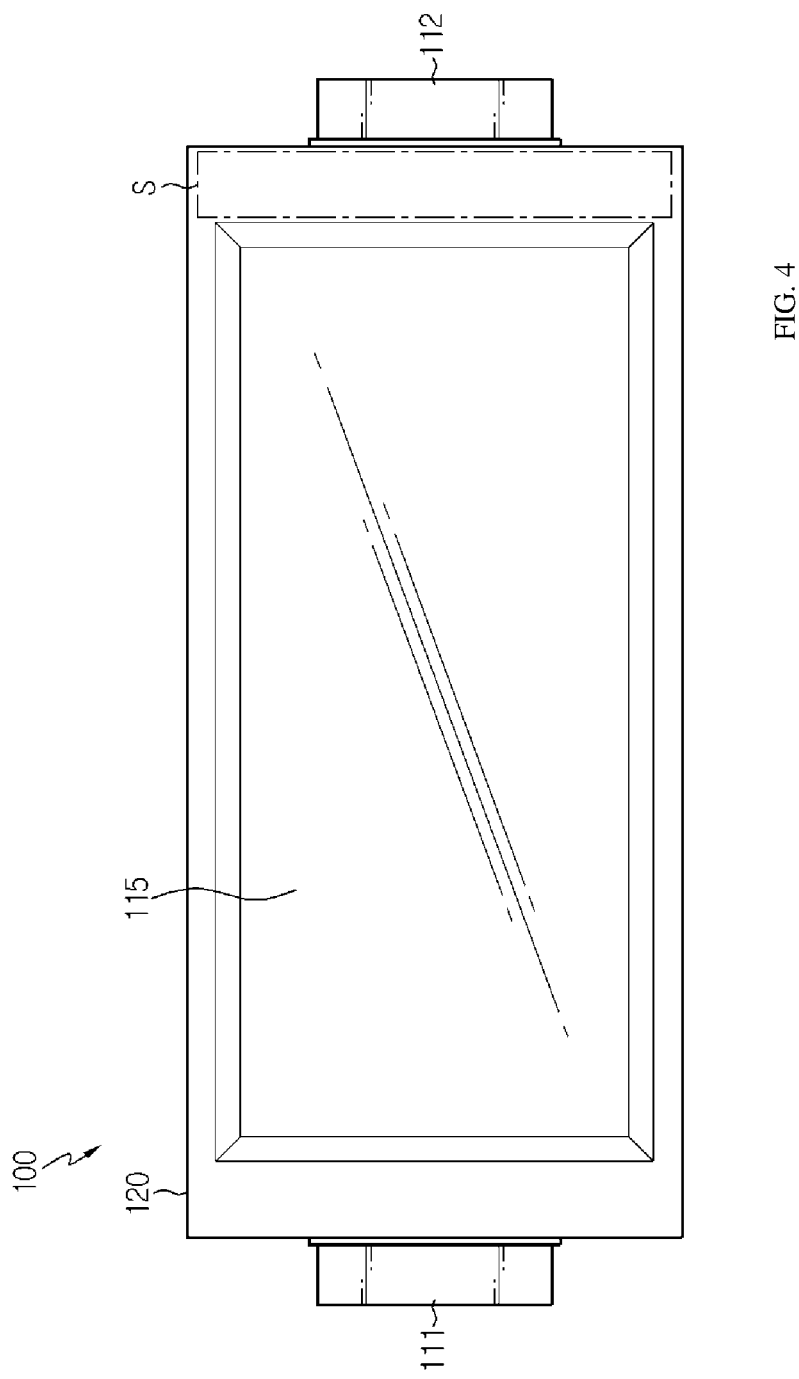
FIG. 4 is a plane view schematically showing a secondary battery, which is a component of the battery module according to an embodiment of the present disclosure.

FIG. 1 is a perspective view schematically showing a battery module according to an embodiment of the present disclosure. FIG. 2 is a front schematically showing the battery module according to an embodiment of the present disclosure. FIG. 3 is a rear view schematically showing the battery module according to an embodiment of the present disclosure. In addition, FIG. 4 is a plane view schematically showing a secondary battery, which is a component of the battery module according to an embodiment of the present disclosure.

Referring to FIGS. 1 to 4, a battery module 300 according to an embodiment of the present disclosure includes a cell stack 310 and bus bar assemblies 200A, 200B.

Here, the cell stack 310 includes a plurality of secondary batteries 100, which respectively have electrode leads 110.

Here, the secondary battery 100 may be a pouch-type secondary battery 100. In particular, the pouch-type secondary battery 100 may include an electrode assembly, an electrolyte and a pouch 120.

Here, the pouch 120 may be composed of two pouches, namely a left pouch and a right pouch, each having a concave accommodation portion 115. Also, the electrolyte assembly and the electrolyte may be accommodated in the accommodation portion 115. In addition, each pouch includes an outer insulating layer, a metal layer and an inner adhesive layer, and the inner adhesive layer is fused to each other at an edge of the pouch 120 to form a sealing portion. Moreover, terrace portions S may be formed at both end portions of the pouch 120 at which a positive electrode lead 111 and a negative electrode lead 112 are formed, respectively.

In addition, the electrode assembly is an assembly of an electrode and a separator, and at least one positive electrode plate and at least one negative electrode plate may be disposed with a separator interposed therebetween. Also, a positive electrode tab is provided at the positive electrode plate of the electrode assembly, and at least one positive electrode tab may be connected to the positive electrode lead 111.

Here, the positive electrode lead 111 has one end connected to the positive electrode tab and the other end exposed out of the pouch 120. The exposed portion may serve as an electrode terminal of the secondary battery 100, for example a positive electrode terminal of the secondary battery 100.

Also, a negative electrode plate of the electrode assembly includes a negative electrode tab, and at least one negative electrode tab may be connected to a negative electrode lead 112. In addition, the negative electrode lead 112 has one end connected to the negative electrode tab and the other end exposed out of the pouch, and the exposed portion may serve as an electrode terminal of the secondary battery 100, for example a negative electrode terminal of the secondary battery 100.

Moreover, the positive electrode lead 111 and negative electrode lead 112 may be formed at both ends opposite to each other, based on the center of the secondary battery 100. Namely, the positive electrode lead 111 may be provided at one end portion, based on the center of the secondary battery 100. In addition, the negative electrode lead 112 may be provided at the other end portion, based on the center of the secondary battery 100. For example, as shown in FIGS. 1 and 2, each secondary battery 100 may be configured such that the positive electrode lead 111 and the negative electrode lead 112 protrude forward and backward.

Thus, according to this configuration of the present disclosure, in one secondary battery 100, there is no interference between the positive electrode lead 111 and the negative electrode lead 112, thereby widening the area of the electrode lead 110.

Also, the positive electrode lead 111 and the negative electrode lead 112 may be configured in a plate form. In particular, the positive electrode lead 111 and the negative electrode lead 112 may protrude in a horizontal direction in a state of standing so that their broad surfaces are oriented to left and right sides.

In addition, the secondary battery 100 may be provided in plural in the battery module 300, and the plurality of secondary batteries 100 may be arranged to be stacked in at least one direction. For example, as shown in FIGS. 1 and 2, a plurality of pouch-type secondary batteries 100 may be stacked on each other in parallel in the right and left direction.

At this time, each pouch-type secondary battery 100 may be disposed to stand approximately perpendicular to the ground so that two broad surfaces positioned are respectively located at left and right and the sealing portions are located at upper, lower, front and rear portions, when viewed in the direction F (shown in FIG. 1). In other words, each secondary battery 100 may be configured in a vertically standing form. Meanwhile, in this specification, the upper, lower, front, rear, right and left directions are set based on the direction F, unless otherwise specified.

However, the battery module 300 according to the present disclosure is not limited to the pouch-type secondary battery 100 described above, and various kinds of secondary batteries 100 known at the time of filing of this application may be employed.

Referring to FIGS. 1 to 3 again, the bus bar assembly 200A may include a connection bus bar 210 and a coupling bus bar 220A.

Specifically, the connection bus bar 210 may be configured to contact two or more of the electrode leads 110 of the cell stack 310. That is, the connection bus bar 210 may be configured to electrically connect two or more secondary batteries 100 with each other in parallel and/or in series.

In addition, the connection bus bar 210 may include an electrically conductive material. More specifically, the electrically conductive material may be a metal with high conductivity, for example copper, aluminum, nickel or gold.

For example, as shown in FIGS. 2 and 3, seven connection bus bars 210 are configured to electrically connect twelve secondary batteries 100 in parallel and in series. Specifically, three connection bus bars 210A of FIG. 2 may be in contact with four positive electrode leads 111 or four negative electrode leads 112. Also, two connection bus bars 210B of FIG. 3 are in contact with two positive electrode leads 111 and two negative electrode leads 112. In addition, two connection bus bars 210B2 of FIG. 2 are contacted and connected to two negative electrode leads 112, respectively.

Figure 5:
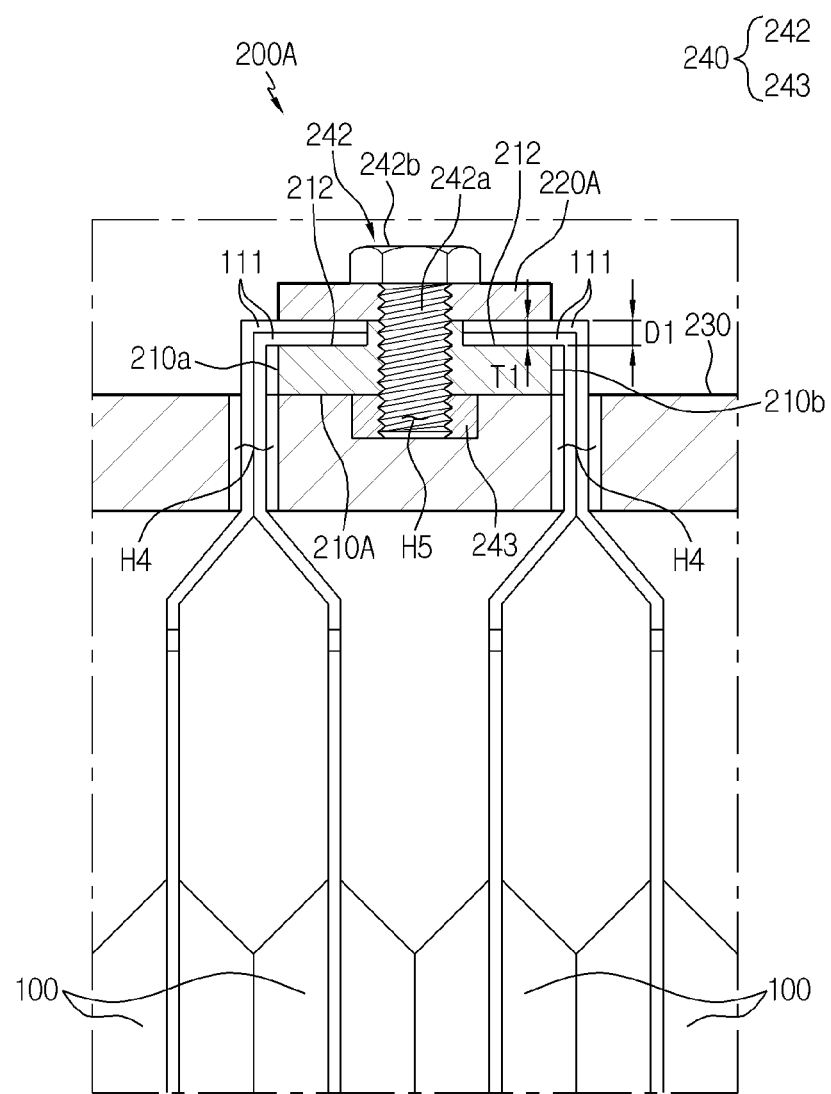
FIG. 5 is a partial cross-sectioned view schematically showing the battery module, taken along the line A-A' of FIG. 2.

FIG. 5 is a partial cross-sectioned view schematically showing the battery module, taken along the line A-A' of FIG. 2.

Referring to FIG. 5, the connection bus bar 210A may include an insert groove 212 formed so that the at least one electrode lead 110 is inserted therein.

In particular, the insert groove 212 may have a shape corresponding to or greater than the shape of a portion of the electrode lead 110 that is placed on the front surface of the connection bus bar 210A. Also, a portion of the insert groove 212 may be recessed at the front surface of the connection bus bar 210A from a front end to a rear end thereof. In addition, the recessed depth D1 of the insert groove 212 may be equal to or smaller than the entire thickness T1 of the at least one electrode lead 110 in the inserting direction, inserted into the insert groove 212.

That is, the outer surface of the at least one electrode lead 110 inserted into the insert groove 212 is located on the same line as the surface of the front end of the connection bus bar 210A where the insert groove 212 is not formed, or the outer surface of the at least one electrode lead 110 may be positioned to protrude forwards further to the front end of the connection bus bar 210A.

Moreover, the width of the insert groove 212 in the upper and lower direction may be greater than the length of the electrode lead 110 in the upper and lower direction, inserted into the insert groove 212.

Also, the coupling bus bar 220A may be coupled to the connection bus bar 210A and located at the front end of the connection bus bar 210A. That is, the rear surface of the coupling bus bar 220A may be formed to press the front surface of the electrode lead 110 in contact with the insert groove 212 of the connection bus bar 210A.

In addition, the coupling bus bar 220A may include an electrically conductive material. More specifically, the electrically conductive material may be a metal with high conductivity, for example copper, aluminum, nickel or gold.

Thus, according to this configuration of the present disclosure, since the front surface of the at least one electrode lead 110 inserted into the insert groove 212 is located on the same line as the front surface of the connection bus bar 210A or located to protrude further therefrom, the electrode lead 110 may be effectively compressed to the coupling bus bar 220A. Accordingly, a highly reliable electrical connection may be achieved without a bonding process such as laser welding between the connection bus bar 210A and the electrode lead 110. Also, the electrode lead 110 may be firmly fixed in the insert groove 212 by compression of the coupling bus bar 220A.

Further, the connection bus bar 210A and the coupling bus bar 220A may have a bar shape extending in the upper and lower direction, when viewed macroscopically. Specifically, the connection bus bar 210A and the coupling bus bar 220A may include a front surface, a rear surface and side surfaces. In addition, the insert groove 212 may be formed at the front surface of the connection bus bar 210A.

Meanwhile, referring to FIGS. 1 and 5, the bus bar assembly 200A may further include a bus bar frame 230.

Here, the connection bus bar 210A may be loaded on the front surface of the bus bar frame 230 to fix the connection bus bar 210A. In addition, the bus bar frame 230 may position the connection bus bar 210A so that the electrode lead 110 of the cell stack 310 is in contact with the connection bus bar 210A at a suitable position.

Specifically, the bus bar frame 230 may include an electrically insulating material. For example, the electrically insulating material may be plastic.

Also, the bus bar frame 230 may be positioned between the front portion of the body of the secondary battery 100 and the rear portion of the connection bus bar 210A. That is, the bus bar frame 230 may be configured to have a perforation hole H4 through which the electrode lead 110 of the cell stack 310 passes, or so that the electrode lead 110 passes by the side portion of the bus bar frame 230 and protrudes forwards.

For example, as shown in FIG. 1, the battery module 300 includes two bus bar frames 230 located at front and rear portions, respectively. Here, the bus bar frame 230 located at the front portion is located between the front portion of the body of the secondary battery 100 of the cell stack 310 and the rear portion of the connection bus bar 210A, and the connection bus bar 210A is mounted on the front surface of the bus bar frame 230.

Thus, according to this configuration of the present disclosure, the bus bar frame 230 is made of an insulating material to prevent a short circuit from occurring between the connection bus bar 210A and the secondary battery 100. Also, since the connection bus bar 210A is fixed to the front surface of the bus bar frame 230, electrical connection between the connection bus bar 210A and the electrode lead 110 may be easily achieved.

Referring to FIG. 5 again, the bus bar assembly 200A may further include a fastening member 240 configured to couple the connection bus bar 210A and the coupling bus bar 220A to each other.

Specifically, the fastening member 240 may include a fastening bolt 242 inserted through the connection bus bar 210A and the coupling bus bar 220A.

Here, the fastening bolt 242 may include a head 242$b$ and a cylindrical rod 242$a$. In addition, a thread may be formed on the cylindrical rod 242$a$. The cylindrical rod 242$a$ may be inserted and fixed in the bus bar frame 230. Also, for this purpose, a fastening groove H5 may be formed at the bus bar frame 230 so that a portion of the cylindrical rod 242$a$ may be inserted and fixed therein.

In addition, the fastening member 240 may further include a nut 243 configured so that the cylindrical rod 242$a$ of the fastening bolt 242 is inserted and fixed therein. Further, the nut 243 may be inserted and fixed in the bus bar frame 230. That is, the fastening bolt 242 is configured such that the cylindrical rod 242a passes through the connection bus bar 210A and the coupling bus bar 220A, and an end portion of the cylindrical rod 242a is inserted and fixed in the nut 243 inserted in the bus bar frame 230.

Thus, according to this configuration of the present disclosure, since the bus bar assembly 200A may stably fix the connection bus bar 210A and the coupling bus bar 220A to the bus bar frame 230 by using the fastening member 240, it is possible to increase the product durability.

Further, in the present disclosure, since the gap between the connection bus bar 210A and the coupling bus bar 220A may be controlled by adjusting the distance between the head 242b of the fastening bolt 242 and the bus bar frame 230, the coupling bus bar 220A may press the electrode lead 110 inserted into the insert groove 212 with an appropriate compression force so that the electrode lead 110 and the connection bus bar 210A are electrically connected reliably.

Referring to FIG. 5 again, the insert groove 212 may be formed in plural at the connection bus bar 210. Specifically, some of the plurality of insert grooves 212 may be shaped to extend from the left end to the center of the front surface of the connection bus bar 210. In addition, the other of the plurality of insert grooves 212 may extend from the right end to the center of the front surface of the connection bus bar 210.

In addition, the end portion of the at least one electrode lead 110 inserted from the left side to the right side of the front surface of the connection bus bar 210 may be inserted into the insert groove 212 formed to extend from the left end 210a to the center of the front surface of the connection bus bar 210.

Moreover, the end portion of the at least one electrode lead 110 inserted from the right side to the left side of the front surface of the connection bus bar 210 may be inserted into the insert groove 212 formed to extend from the right end 210b to the center of the front surface of the connection bus bar 210.

For example, as shown in FIG. 5, two insert grooves 212 may be formed at the front surface of the connection bus bar 210. One insert groove 212 may be shaped to extend from the left end 210a to the center of the front surface of the connection bus bar 210. Also, the other insert groove 212 may be shaped to extend from the right end 210b to the center of the front surface of the connection bus bar 210.

Further, two stacked positive electrode leads 111 inserted from the left side to the right side of the front surface of the connection bus bar 210 may be placed in the insert groove 212 extending from the left end 210a to the center. Moreover, end portions of the two stacked positive electrode leads 111 inserted from the right side to the left side of the front surface of the connection bus bar 210 may be placed in the insert groove 212 extending from the right end 210b to the center.

Thus, according to this configuration of the present disclosure, a side surface of the electrode lead 110 having a relatively larger surface than the other surfaces is placed in the insert groove 212 of the connection bus bar 210 and compresses the electrode lead 110 to the rear surface of the coupling bus bar 220A, thereby allowing highly reliable electric connection without a bonding process such as laser welding between the bus bar and the electrode lead 110 and also stably fixing the electrode lead 110 to the insert groove 212.

Thus, according to this configuration of the present disclosure, the electrode lead 110 contacting the bus bar may be easily detached during the work of separating the bus bar assembly 200A from the cell stack 310 due to erroneously bonding or erroneous assembling. Further, in the present disclosure, the separated connection bus bar 210 may be easily connected to the electrode lead 110 again. Moreover, even though it is impossible in the prior art to rework the bus bar assembly 200A due to damage of the electrode lead 110, the present disclosure allows the rework without seriously damaging the electrode lead 110.

Figure 6:
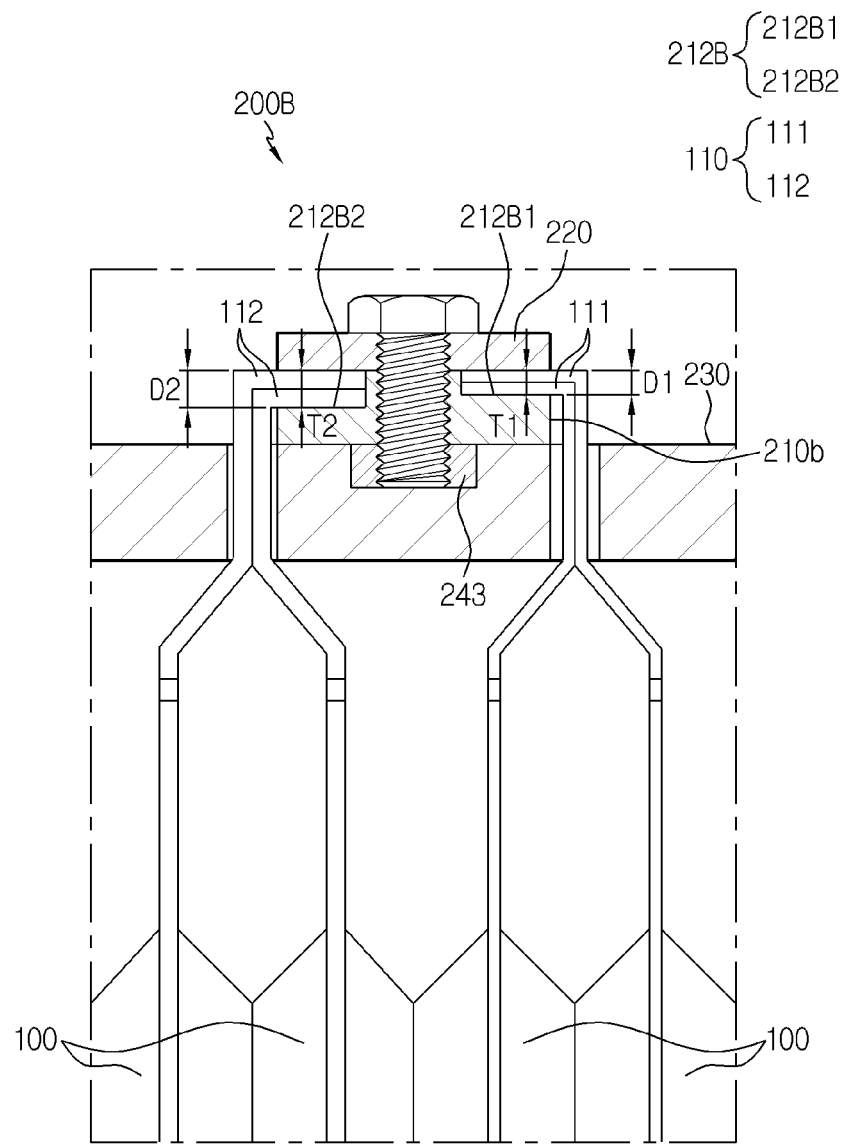
FIG. 6 is a partial cross-sectioned view schematically showing components of a bus bar assembly employed at the battery module, taken along the line B-B' of FIG. 3.

FIG. 6 is a partial cross-sectioned view schematically showing components of a bus bar assembly employed at the battery module, taken along the line B-B' of FIG. 3.

Referring to FIG. 6, in a bus bar assembly 200B according to another embodiment of the present disclosure, a plurality of positive electrode leads 111 and a plurality of negative electrode leads 112 may be connected to one connection bus bar 210B. Also, the thicknesses T1 of the plurality of positive electrode leads 111 and the plurality of negative electrode leads 112 in the direction of being inserted into the insert grooves 212B may be different from each other.

In addition, in order for the connection bus bar 210B and the coupling bus bar 220A to effectively compress the electrode lead 110, the front surface of the plurality of electrode leads 110 inserted into the insert groove 212B should be located on the same line as the non-recessed front surface of the connection bus bar 210B or protrude therefrom.

In this consideration, when the positive electrode lead 111 has a thickness T1 thinner than the negative electrode lead 112, the connection bus bar 210B of the present disclosure may be formed so that the depth D1 of the insert groove 212B1 into which the positive electrode lead 111 is inserted and the depth D2 of the insert groove 212B2 into which the electrode lead 112 is inserted are different from each other.

For example, as shown in FIG. 6, since the entire thickness T1 of two positive electrode leads 111 is thinner than the entire thickness T2 of two negative electrode leads 112, the depth D1 of the insert groove 212B1 into which the positive electrode lead 111 is inserted may be smaller than the depth D2 of the insert groove 212B2 into which the negative electrode lead 112 is inserted.

Thus, according to this configuration of the present disclosure, when the thicknesses T1 of the positive electrode lead 111 and the negative electrode lead 112 in contact with the insert groove 212B are different from each other, since the depth D1 of the insert groove 212B into which the positive electrode lead 111 and the depth D1 of the insert grooves 212B into which the negative electrode lead 112 is inserted are set to be different from each other, it is possible to effectively solve the problem that a gap is created between the coupling bus bars 220A and the connection bus bars 210B to deteriorate the reliability of the electrical connection.

Figure 7:
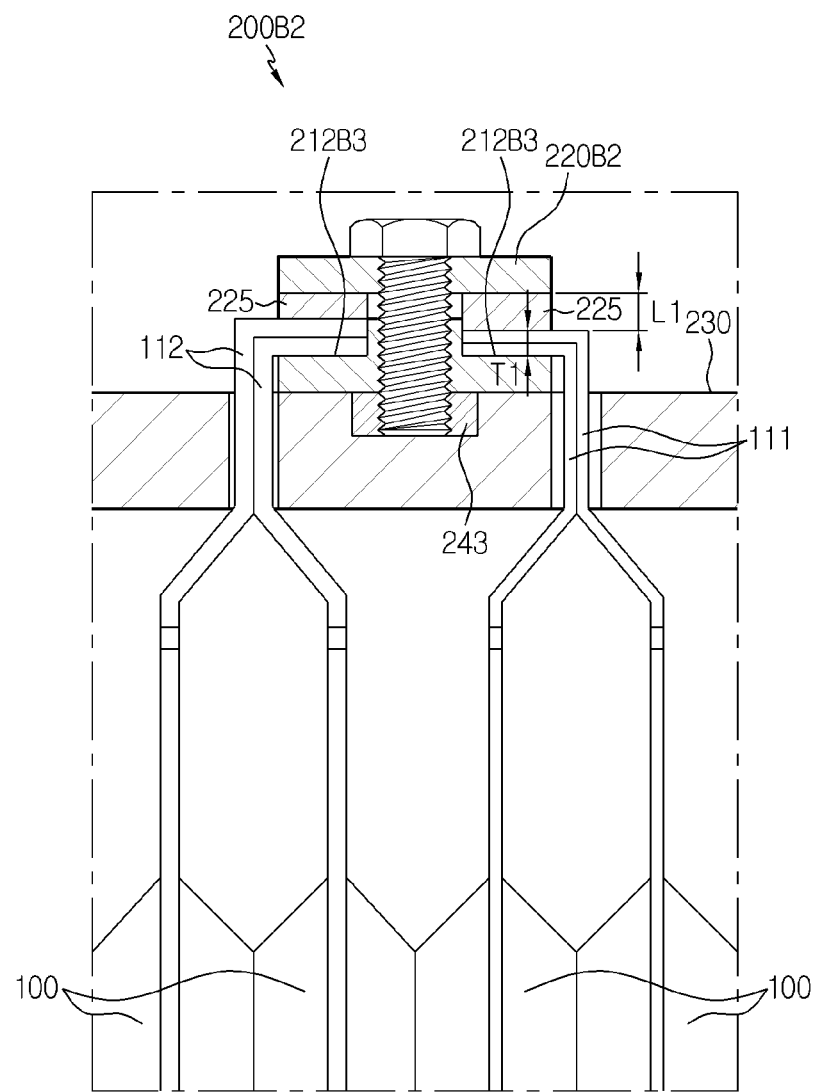
FIG. 7 is a horizontal partial sectioned view schematically showing components of the bar assembly employed at the battery module according to another embodiment of the present disclosure.

FIG. 7 is a horizontal partial sectioned view schematically showing components of the bar assembly employed at the battery module according to another embodiment of the present disclosure.

Referring to FIG. 7, at least one compression protrusion 225 formed to be inserted into one of the insert grooves 212B3 may be formed at the coupling bus bar 220B2. Specifically, each compression protrusion 225 may be formed at a position corresponding to each insert groove 212B3 of the connection bus bar 210B on the rear surface of the coupling bus bar 220B2.

Thus, according to this configuration of the present disclosure, the compression protrusion 225 may effectively compress the outer surface of the electrode lead 110 inserted into the insert groove 212B3 of the connection bus bar 210B, thereby minimizing the gap between the coupling bus bar 220B2 and the connection bus bar. Thus, the reliability of the electrical connection between the electrode lead 110 and the connection bus bar 210B may be enhanced.

More specifically, two or more compression protrusions 225 may be formed at the coupling bus bar 220B2. Also, the positive electrode lead 111 and the negative electrode lead 112 having different polarities may be inserted into the plurality of insert grooves 212B3.

At this time, ridged surfaces of the two or more compression protrusions 225 protruding in a direction of being inserted into the insert grooves 212B3 may have different protruding lengths L1. That is, the protruding length L1 of the compression protrusion 225 at a location corresponding to the insert groove 212B3 may be set according to the thickness T1 of the electrode lead 110 inserted into the insert groove 212B3.

For example, as shown in FIG. 7, two connection grooves 212B3 are formed at the connection bus bar 210B, and two negative electrode leads 112 and two positive electrode leads 111 are inserted into the insert grooves 212B3, respectively.

Also, two compression protrusions 225 are formed on the rear surface of the coupling bus bar 220B2 at positions corresponding to the two insert grooves 212B3. In addition, the compression protrusion 225 compressing the negative electrode lead 112 may have a smaller size than the compression protrusion 225 compressing the positive electrode lead 111.

Thus, according to this configuration of the present disclosure, even though the depths D1 of the plurality of insert grooves 212B3 formed at the connection bus bar 210B are not set to be different from each other, the positive electrode lead 111 and the negative electrode lead 112 inserted into the insert groove 212B3 may be effectively compressed using the compression protrusions 225 formed at the coupling bus bar 220B2 and having different protrusion lengths L1.

Figure 8:
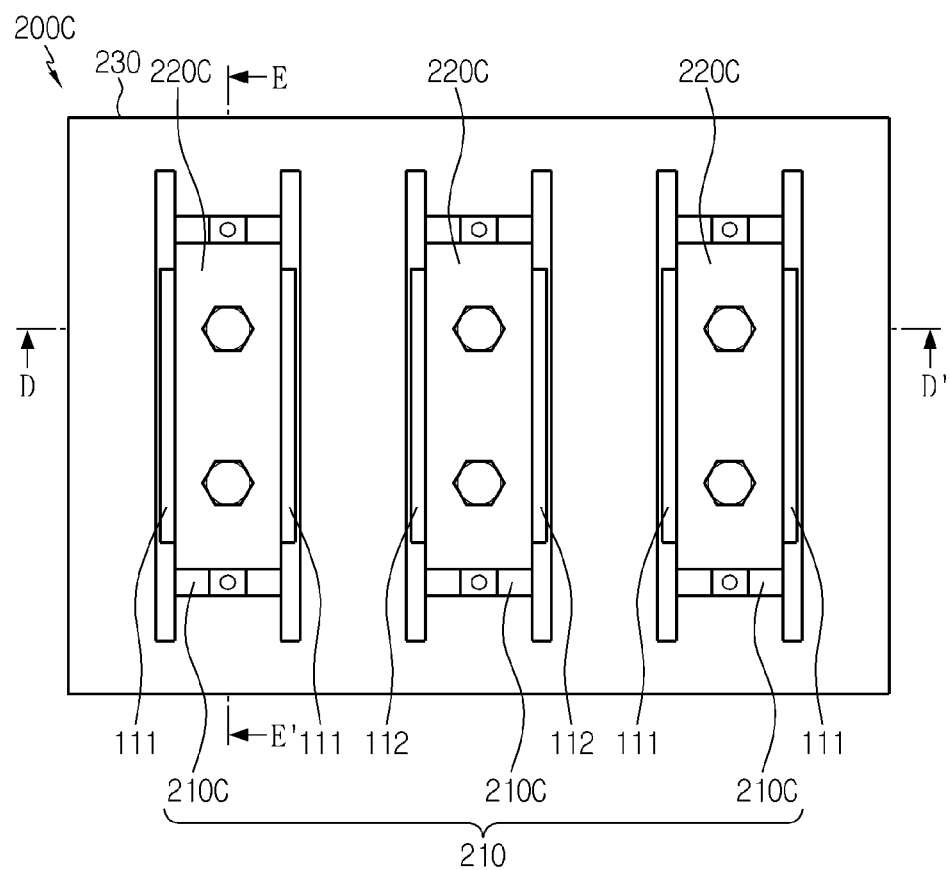
FIG. 8 is a front view schematically showing a battery module according to another embodiment of the present disclosure.
Figure 9:
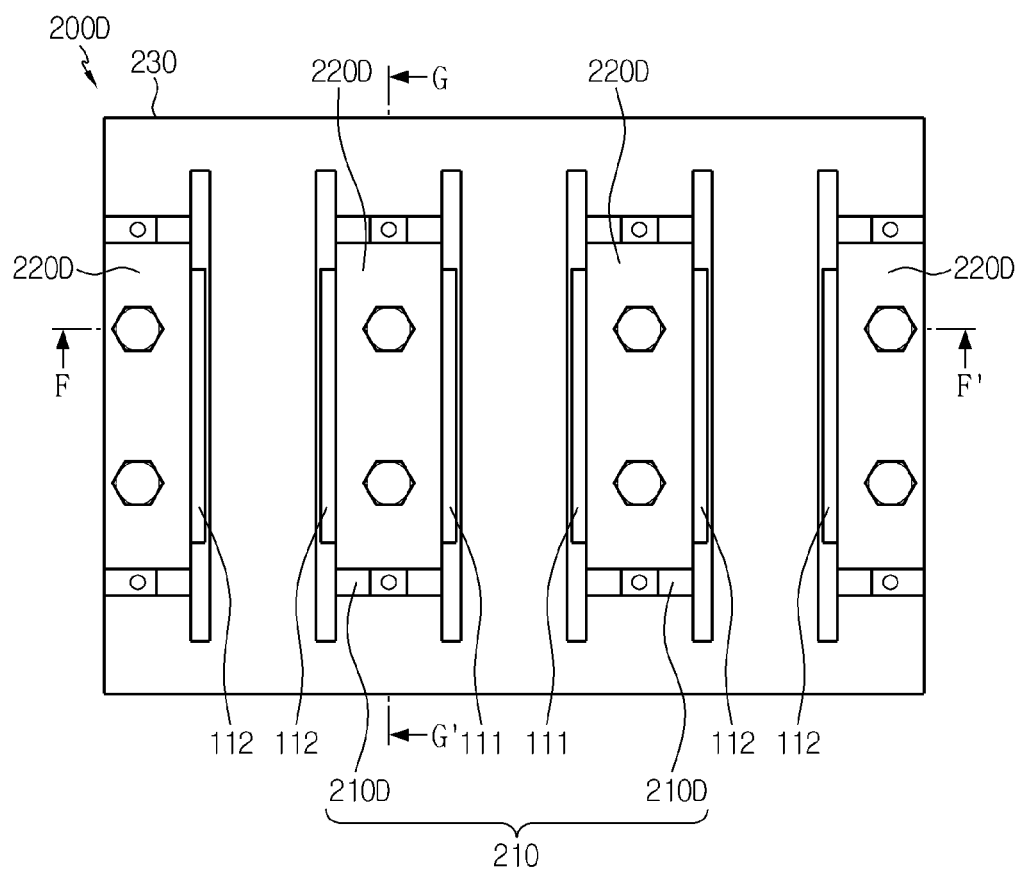
FIG. 9 is a rear view schematically showing the battery module according to another embodiment of the present disclosure.
Figure 10:
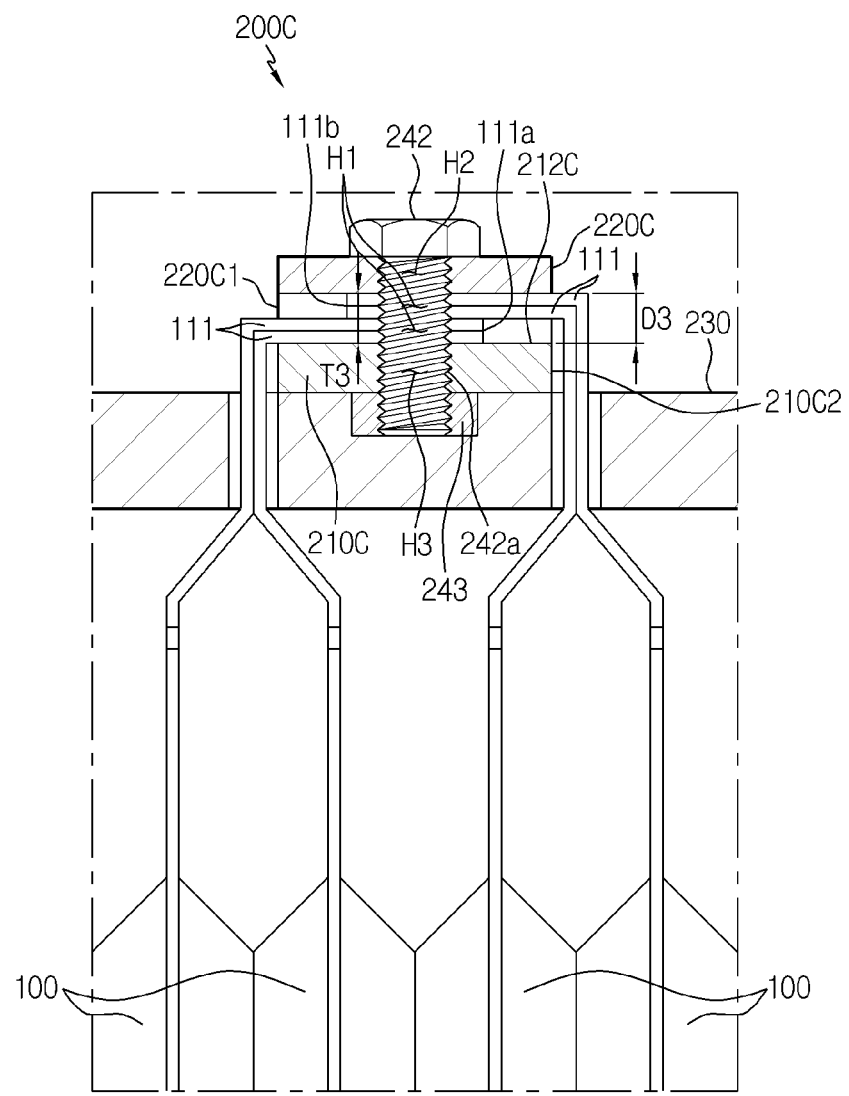
FIG. 10 is a partial cross-sectioned view schematically showing the battery module, taken along the line D-D' of FIG. 8.
Figure 11:
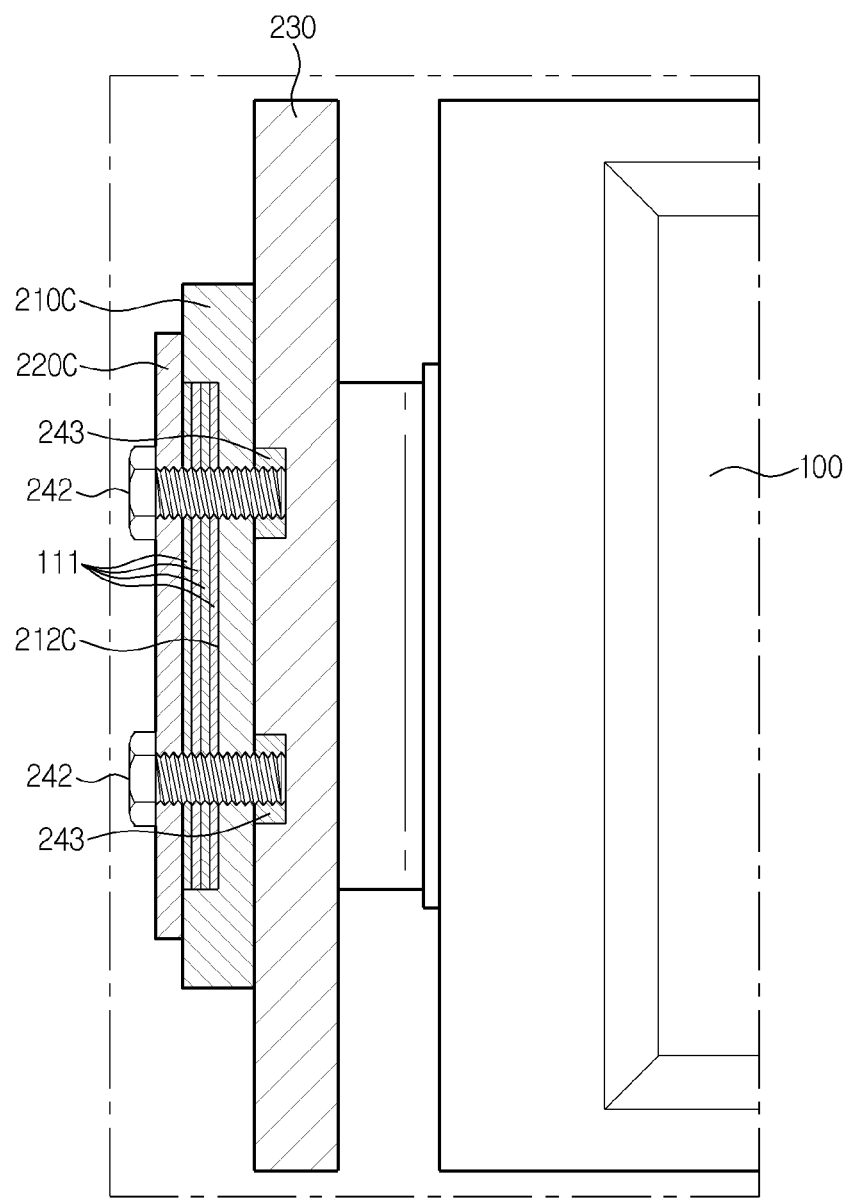
FIG. 11 is a vertical partial sectioned view schematically showing the battery module, taken along the line E-E' of FIG. 8.

FIG. 8 is a front schematically showing a battery module according to another embodiment of the present disclosure. FIG. 9 is a rear view schematically showing the battery module according to another embodiment of the present disclosure. FIG. 10 is a partial cross-sectioned view schematically showing the battery module, taken along the line D-D' of FIG. 8. In addition, FIG. 11 is a vertical partial sectioned view schematically showing the battery module, taken along the line E-E' of FIG. 8.

Referring to FIGS. 8 to 11, the bus bar assembly 200C is different from the bus bar assembly 200A of FIG. 1 in view of the configuration of the connection bus bar 210C.

That is, the insert groove 212C formed at the connection bus bar 210C of the bus bar assembly 200C may be formed to extend from the left end 210C1 to the right end 210C2 of the front surface of the connection bus bar 210C. In other words, the insert groove 212C may be formed so that its portion recessed downwards (inwards) at the front surface of the connection bus bar 210C extends from the left end 210C1 to the right end 210C2.

At this time, the bent end portion 111a of the electrode lead 111 inserted from the left side to the right side of the connection bus bar 210C and the bent end portion 111b of the electrode lead 111 inserted from the right side to the left side of the connection bus bar 210C may be located to be stacked at the insert groove 212C.

In addition, a perforation hole H1 may be formed at the electrode lead 111 so that the fastening bolt 242 is inserted therein. That is, if the fastening member 240 (FIG. 5) is inserted into the perforation hole H1, the plurality of the electrode leads 111 and the connection bus bar 210C may be integrally connected. Further, the perforation hole H1 may be formed at the stacked end portion of the electrode lead 111.

For example, as shown in FIG. 10, two positive electrode leads 111 may be inserted from the left side to the right side of the connection bus bar 210C, and two end portions of the inserted positive electrode leads 111 may be stacked on each other and inserted into the insert groove 212C. Also, two positive electrode leads 111 may be inserted from the right side to the left side of the connection bus bar 210C, and two end portions of the inserted positive electrode leads 111 may be stacked on each other and inserted into the insert groove 212C.

In addition, as shown in FIG. 10, the end portions of two positive electrode leads 111 and the end portions of two positive electrode leads 111 may be disposed to be stacked on each other. Further, a perforation hole H1 may be formed at the stacked end portions of the positive electrode leads 111 so that the fastening bolt 242 is inserted therein.

Also, a fastening hole H2 and an insert hole H3 may be formed at the coupling bus bar 220C and the connection bus bar 210C, respectively, so that the cylindrical rod 242a of the fastening bolt 242 may be inserted therethrough. Further, the fastening bolt 242 may be inserted and fixed in the bus bar frame 230.

Thus, according to this configuration of the present disclosure, if the fastening bolt 242 is inserted into the electrode lead 111, the tightening force of the fastening bolt 242 may be directly transmitted to the electrode lead 111, thereby electrically connecting the electrode leads 110 more reliably.

In addition, the recessed depth D3 of the insert groove 212C may be equal to or smaller than the entire thickness T3 of the end portions of the electrode leads 111 stacked in the insert groove 212C in the inserting direction. For example, as shown in FIG. 10, the recessed depth D3 of the insert groove 212C may be equal to the entire thickness T3 of the end portions of the electrode leads 110 stacked in the insert groove 212C in the inserting direction.

Thus, according to this configuration of the present disclosure, the coupling bus bar 220C and the electrode lead 110 may contact each other more easily, and the electrode lead 110 may be effectively compressed to the insert groove 212C of the connection bus bar 210C by the coupling bus bar 220C, thereby improving the reliability of electrical connection.

Figure 12:
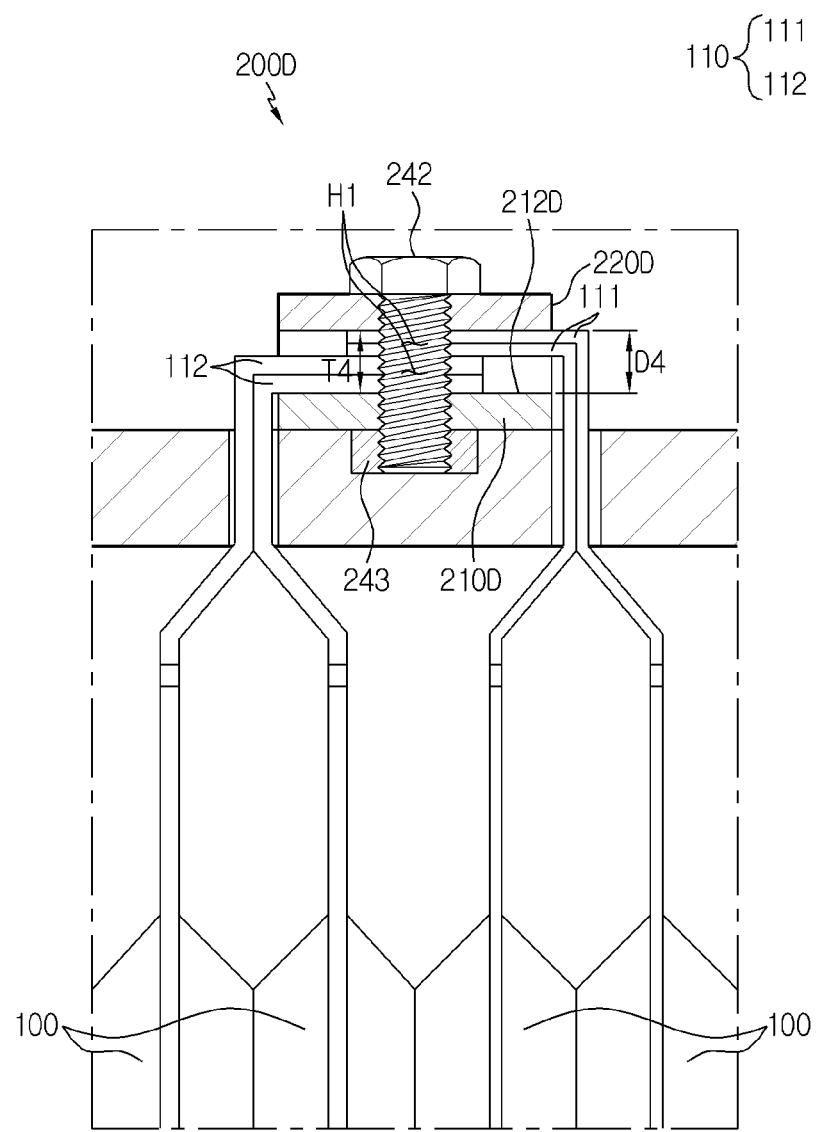
FIG. 12 is a partial cross-sectioned view schematically showing the battery module, taken along the line F-F' of FIG. 9.

FIG. 12 is a partial cross-sectioned view schematically showing the battery module, taken along the line F-F' of FIG. 9. In addition, FIG. 13 is a partial cross-sectioned view schematically showing the battery module, taken along the line G-G' of FIG. 9

Figure 13:
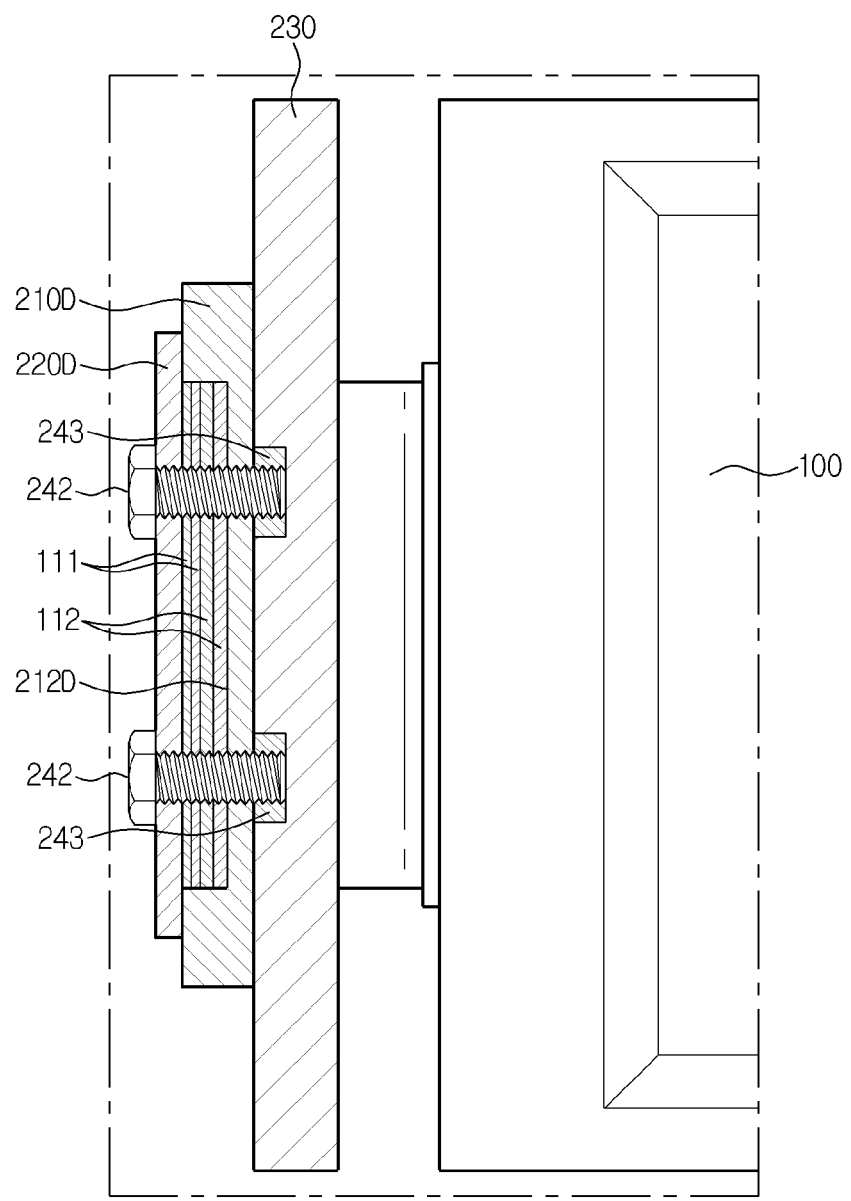
FIG. 13 is a partial cross-sectioned view schematically showing the battery module, taken along the line G-G' of FIG. 9

Referring to FIGS. 12 and 13, in the bus bar assembly 200D, the negative electrode lead 112 may be inserted into the insert groove 212D from the left side to the right side of the connection bus bar 210D. Also, the positive electrode lead 111 may be inserted into the insert groove 212D from the right side to the left side of the connection bus bar 210D. At this time, the bent end portion of the negative electrode lead 112 and the bent end portion of the positive electrode lead 111 may be disposed to be stacked on each other. In addition, a perforation hole H1 may be formed at the stacked end portions so that the fastening bolt 242 is inserted therein.

At this time, in order for the connection bus bar 210D and the coupling bus bar 220D to effectively compress the electrode lead 110, it is needed that the front surface of the electrode lead 110, namely any one of the positive electrode lead 111 and the negative electrode lead 112 located at an uppermost side, stacked in the insert groove 212D is located on the same line as the non-recessed front surface of the connection bus bar 210D or to protrude further.

In this consideration, the depth D4 recessed in the insert groove 212D may be set to be equal to or smaller than the stacked thickness T4 of the bent end portion of the negative electrode lead 112 and the bent end portion of the positive electrode lead 111.

For example, as shown in FIG. 12, two negative electrode leads 112 may be inserted into the insert groove 212D from the left side to the right side of the connection bus bar 210D, and two positive electrode leads 111 may be inserted into the insert groove 212D from the right side to the left side of the connection bus bar 210D. Also, the end portions of the two negative electrode leads 112 and the end portions of the two positive electrode leads 111 may be stacked on each other. In addition, the recessed depth D4 of the insert groove 212D of the connection bus bar 210D may be set to be equal to the stacked thickness T4 of the bent end portion of the two negative electrode leads 112 and the bent end portion of the two positive electrode leads 111.

Thus, according to this configuration of the present disclosure, since the insert groove 212D of the connection bus bar 220D is set to be equal to or smaller than the stacked thickness of the bent end portions of the negative electrode lead 112 and the positive electrode lead 111, the coupling bus bar 220D may effectively compress the electrode leads 110 inserted in the insert groove 212D, thereby enhancing the reliability of electrical connection securely fixing the electrode leads 110 to the insert groove 212D by the compression of the coupling bus bar 220D.

Also, since the bus bar assembly 200D of the present disclosure may have only one insert groove formed in the connection bus bar 220D, the manufacturing process may be simplified as compared with the bus bar assembly 200B of FIG. 3.

Meanwhile, even though the terms indicating directions such as upper, lower, left, right, front and rear directions are used in the specification, it is obvious to those skilled in the art that these merely represent relative positions for convenience in explanation and may vary based on a position of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Reference Signs

| | |
|---|---|
| 300: battery module | 220A, 220B: coupling bus bar |
| 310: cell stack | 225: compression protrusion |
| 100: secondary battery | 230: bus bar frame |
| 110, 111, 112: electrode lead | 240: fastening member |
| H1: perforation hole | 242: fastening bolt |
| 200A to 200D: bus bar assembly | 243: nut |
| 210: connection bus bar | |
| 212: insert groove | |

INDUSTRIAL APPLICABILITY

The present disclosure relates to a battery module including a bus bar assembly. In addition, the battery module of the present disclosure is applicable to a battery pack including a plurality of battery modules and electric components, and industries related to electronic devices, energy storage systems or vehicles including the battery pack.

What is claimed is:
1. A battery module, comprising:
a cell stack formed by stacking a plurality of secondary batteries having electrode leads on each other in a stacking direction; and
a bus bar assembly configured to electrically connect the plurality of secondary batteries to each other and including a connection bus bar contacting two or more of the electrode leads of the plurality of secondary batteries and having a plurality of insert grooves formed so that at least one of the electrode leads is inserted in each of the plurality of insert grooves, and a coupling bus bar coupled to the connection bus bar and having a rear surface formed to press the at least one of the electrode leads inserted in respective ones of the plurality of insert grooves,
wherein the electrode leads include a positive electrode lead and a negative electrode lead,
wherein a depth of the insert groove into which the positive electrode lead is inserted and a depth of the insert groove into which the negative electrode lead is inserted are different,
wherein two or more compression protrusions are formed at the coupling bus bar so as to be inserted into respective ones of the plurality of insert grooves, and
wherein ridged surfaces of the two or more compression protrusions protruding to be inserted into respective ones of the plurality of insert grooves have different protruding lengths.

2. The battery module according to claim 1,
wherein the connection bus bar and the coupling bus bar each have a bar shape extending in a vertical direction perpendicular to the stacking direction, and the plurality of insert grooves are formed at a front surface of the connection bus bar.

3. The battery module according to claim 2,
wherein a width of each of the plurality of insert grooves in the vertical direction is equal to or greater than a length of the at least one of the electrode leads inserted into the respective insert groove in the vertical direction.

4. The battery module according to claim 2,
wherein one of the plurality of insert grooves is formed to extend from a left end to a center of the front surface of the connection bus bar, and another of the plurality of insert grooves is formed to extend from a right end to the center of the front surface of the connection bus bar,
wherein an end portion of at least one of the electrode leads inserted from a left side to a right side of the front surface of the connection bus bar is inserted into the insert groove formed to extend from the left end to the center of the front surface of the connection bus bar, and
wherein an end portion of at least one of the electrode leads inserted from the right side to the left side of the front surface of the connection bus bar is inserted into the insert groove formed to extend from the right end to the center of the front surface of the connection bus bar.

5. The battery module according to claim 1,
wherein each of the plurality of insert grooves has a structure recessed from a front end to a rear end of the connection bus bar, and
wherein a recessed depth of each of the plurality of insert grooves is equal to or smaller than an entire thickness of the at least one of the electrode leads inserted into the respective insert groove.

6. The battery module according to claim 1,
wherein the bus bar assembly further includes a bus bar frame having a front surface on which the connection bus bar is disposed, the bus bar frame being located between a front portion of the cell stack and a rear portion of the connection bus bar.

7. The battery module according to claim 6,
wherein the bus bar assembly further includes a fastening member configured to couple the connection bus bar and the coupling bus bar to each other.

8. The battery module according to claim 7,
wherein the fastening member further includes a fastening bolt inserted through the connection bus bar and the coupling bus bar, and a cylindrical rod of the fastening bolt is inserted and fixed in the bus bar frame.

9. The battery module according to claim 8,
wherein each of the plurality of insert grooves is formed to extend from one side end to an opposite side end of a front surface of the connection bus bar,
wherein a perforation hole is formed in the at least one of the electrode leads inserted in the respective insert groove and the fastening bolt is inserted therein, and
wherein a bent end portion of one of the electrode leads inserted from a left side to a right side of the connection bus bar and a bent end portion of one of the electrode leads inserted from a right side to a left side of the connection bus bar are stacked on each other in the respective insert groove.

10. A battery pack, comprising at least one battery module according to claim 1.

11. A vehicle, comprising the battery pack according to claim 10.

12. The battery cell module according to claim 1, wherein the bus bar assembly is disposed at a first side of the cell stack, and further comprising:
a second bus bar assembly disposed at a second side of the cell stack opposite the first side and configured to electrically connect the plurality of secondary batteries to each other, and including a second connection bus bar contacting two or more of the electrode leads of the plurality of secondary batteries and having a second insert groove formed so that at least one of the electrode leads is inserted therein, and a second coupling bus bar coupled to the second connection bus bar and having a rear surface formed to press the at least one of the electrode leads inserted in the second insert groove.

\* \* \* \* \*